US012242868B2

(12) United States Patent
Sanderson et al.

(10) Patent No.: US 12,242,868 B2
(45) Date of Patent: Mar. 4, 2025

(54) CAUSING A USER DEVICE TO GENERATE NATIVE USER INTERFACE CONTENT FOR A NATIVE APPLICATION THAT EXECUTES ON A SERVER

(71) Applicant: Microsoft Technology Licensing, LLC, Redmond, WA (US)

(72) Inventors: Steven Sanderson, Bristol (GB); Eilon Joseph Lipton, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/307,747

(22) Filed: Apr. 26, 2023

(65) Prior Publication Data
US 2024/0362043 A1    Oct. 31, 2024

(51) Int. Cl.
    *G06F 9/451*    (2018.01)
(52) U.S. Cl.
    CPC .................... *G06F 9/452* (2018.02)
(58) Field of Classification Search
    CPC ........... G06F 9/452; G06F 9/455; G06F 9/451
    See application file for complete search history.

(56) References Cited

U.S. PATENT DOCUMENTS

| 9,612,724 B2 * | 4/2017 | Laborczfalvi ........... G06F 9/452 |
| 2004/0068735 A1 | 4/2004 | York |
| 2012/0117145 A1 * | 5/2012 | Clift ...................... G06F 3/0481 |
| | | 345/522 |
| 2014/0096014 A1 * | 4/2014 | Johnson .................. H04L 67/75 |
| | | 715/733 |
| 2014/0344837 A1 | 11/2014 | Sharoni |
| 2015/0121193 A1 * | 4/2015 | Beveridge ............. G06F 40/143 |
| | | 715/234 |

OTHER PUBLICATIONS

Jose Miguel Perez-Alvarez et al., From Abstract Specifications to Application Generation, Oct. 1, 2020, IEEE/ACM International Conference on Software Engineering: Software Engineering in Society, pp. 11-20 (Year: 2020).*
Hossein Golestani et al., Characterization of Unnecessary Computations in Web Applications, Mar. 1, 2019, IEEE International Symposium on Performance Analysis of Systems and Software, pp. 11-21 (Year: 2019).*
"All Components", Retrieved From: https://developer.apple.com/design/human-interface-guidelines/components/all-components/, Retrieved Date: Mar. 4, 2023, 5 Pages.

(Continued)

*Primary Examiner* — Tam T Tran
(74) *Attorney, Agent, or Firm* — Wade IP Law PLLC

(57) ABSTRACT

Techniques are described herein that are capable of causing a user device to generate native user interface content for a native application that executes on a server. A native user interface of the native application is caused to be rendered on the user device by providing a user interface rendering instruction in lieu of content of a native interface element from the server to the user device. The user interface rendering instruction instructs the user device to generate the content of the native interface element and to incorporate the content of the native interface element into the native user interface.

20 Claims, 7 Drawing Sheets

(56) References Cited

OTHER PUBLICATIONS

"Basic Forms", Retrieved From: https://hyperview.org/docs/example_basic_form, Retrieved Date: Mar. 4, 2023, 10 Pages.
"Hyperview: Native Mobile Apps, as Easy as Creating a Website", Retrieved From: https://news.ycombinator.com/item?id=34137381, Feb. 26, 2022, 6 Pages.
"Native Mobile Apps, as Easy as Creating a Website", Retrieved From: https://hyperview.org/, Retrieved Date: Mar. 4, 2023, 5 Pages.
"Expo", Retrieved From: https://expo.dev/, Retrieved Date: Dec. 16, 2022, 6 Pages.
International Search Report and Written Opinion received for PCT Application No. PCT/US2024/024834, mailed on Aug. 2, 2024, 13 pages.

\* cited by examiner

CAUSING A USER DEVICE TO GENERATE NATIVE USER INTERFACE CONTENT FOR A NATIVE APPLICATION THAT EXECUTES ON A SERVER

BACKGROUND

Native applications traditionally are executed locally on a user device. A native application is a computer program that is configured to run on a particular platform (e.g., a particular operating system or a particular processor type). Examples of an operating system include but are not limited to a Windows® OS, developed and distributed by Microsoft Corporation; an iOS® operating system (OS), an iPadOS® OS, a macOS® OS, and an OS X® OS, developed and distributed by Apple Inc.; an Android® OS, developed and distributed by Google LLC; and a Linux OS, developed and distributed under the GNU Project. Examples of a processor type include but are not limited to an AMD Ryzen™ processor type, developed and distributed by Advanced Micro Devices, Inc., and an Intel® Core™ processor type, developed and distributed by Intel Corporation. Executing a native application on a user device enables the user device to perform user interface (UI) rendering locally, which enables rich native behaviors. However, updating a native application that executes on a user device typically involves deploying new binaries, waiting for an application store to approve the new binaries, and waiting for a user of the native application to install the new binaries after the new binaries are approved. The new binaries may include proprietary and/or sensitive information. Public application programming interfaces (APIs) often are employed to enable a native application that executes on a user device to interact with backend services in the cloud.

SUMMARY

It may be desirable to execute a native application on a server and to cause a user device to generate native user interface content for the native application. For example, executing the native application on the server may avoid the delay associated with waiting for an application store to approve an update to the native application and the delay associated with waiting for a user to install the update after the update is approved. In accordance with this example, information regarding the update may be provided to the user device, enabling the user device to generate native user interface content that incorporates the update. By causing the user device to generate the native user interface content, for example by providing an instruction that describes the native user interface content in lieu of providing the native user interface content itself, an amount of information sent over a network from the server to the user device may be substantially reduced.

Various approaches are described herein for, among other things, causing a user device to generate native user interface content for a native application that executes on a server. A native user interface is a user interface that is not created using hypertext markup language (HTML). Native user interface content is content of a native user interface. Content of a native user interface includes one or more native interface elements. A native interface element is an interface element that is defined by a platform on which a native application is configured to run. Examples of an interface element include but are not limited to a menu, a button, a text box, and a list. In some approaches, the server is a developer-controlled server. A developer-controlled server is a server that is controlled at least partially by a developer of a native application that executes on the developer-controlled server.

In an aspect, the example approaches differ from traditional thin-client application technologies such as remote desktop. In the traditional thin-client application technologies, UI that is transmitted from a server to a user device is in the form of its graphical representation (e.g., a streaming video displaying the UI, like used for Xbox® cloud gaming) or low-level drawing instructions (e.g., graphics device interface (GDI) for remote desktop, an open graphics library (OpenGL®) application programming interface (API), or an X Windows System windowing system). In accordance with this aspect, UI elements generated by the example approaches have OS-specific native appearances and behaviors, such as animations on interactions and integration with accessibility technology. These native appearances and behaviors do not need to be modelled on the server or described in the server-to-client traffic. Aspects of the native behaviors occur locally on the client device and hence run with zero latency (e.g., a button getting highlighted on mouse hover).

In an example approach, a native application is executed on a server. A native user interface of the native application is caused to be rendered on a user device, which is coupled to the server via a network, by providing a user interface rendering instruction, which instructs (e.g., causes) the user device to generate content of a native interface element and to incorporate the content of the native interface element into the native user interface, in lieu of the content of the native interface element from the server to the user device.

In another example approach, a user interface rendering instruction, which instructs a user device to generate content of a native interface element and to incorporate the content of the native interface element into a native user interface associated with a native application, is received in lieu of the content of the native interface element at the user device from a server that executes the native application and that is coupled to the user device via a network. Based at least on the user interface rendering instruction, the content of the native interface element is generated at the user device. Based at least on the user interface rendering instruction, the content of the native interface element is incorporated into the native user interface at the user device. The native user interface, including the native interface element, is rendered on the user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURESE

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
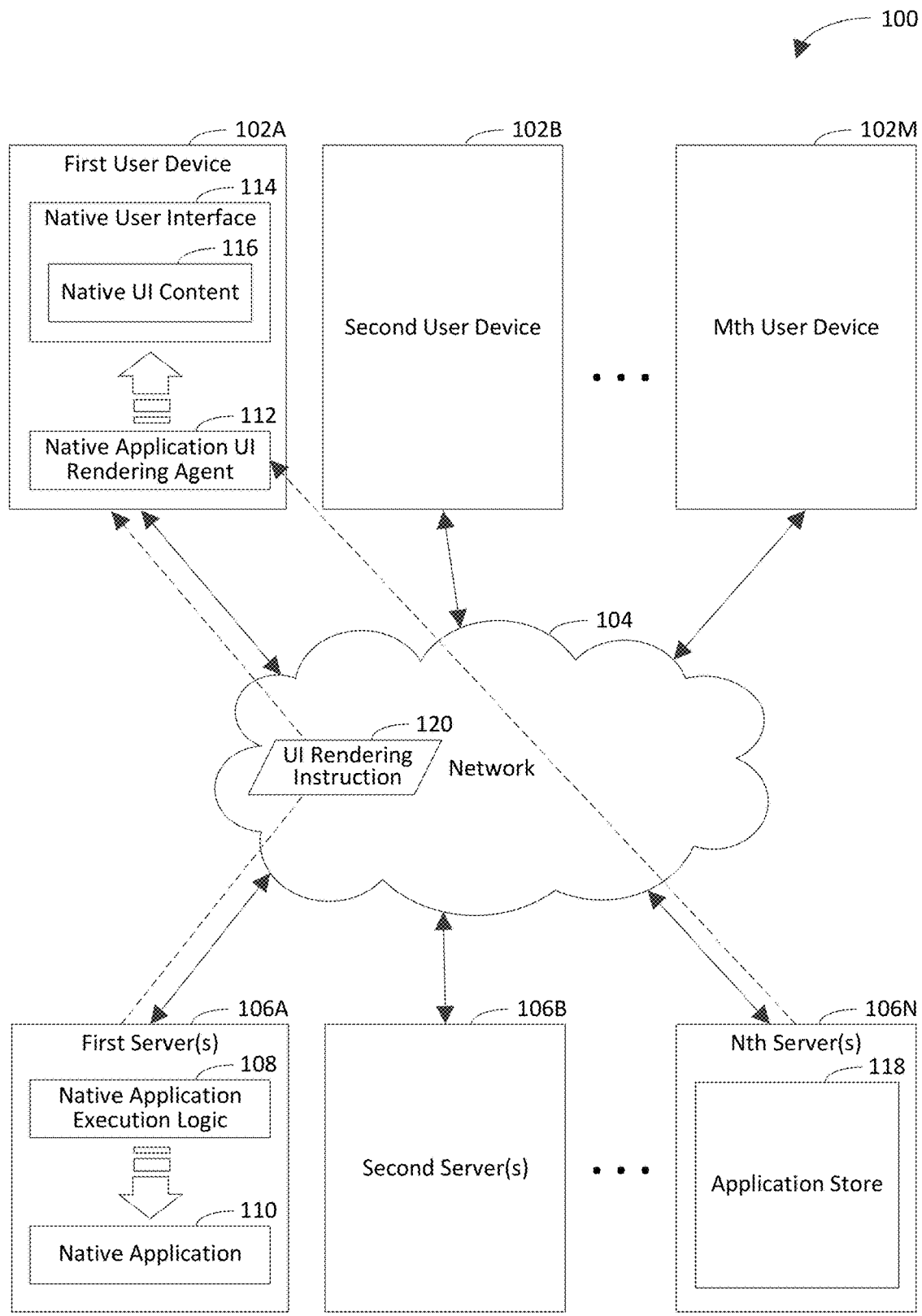
FIG. 1 is a block diagram of an example native user interface generation system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to execute a native application on a server and to cause a user device to generate native user interface content for the native application. For example, executing the native application on the server may avoid the delay associated with waiting for an application store to approve an update to the native application and the delay associated with waiting for a user to install the update after the update is approved. In accordance with this example, information regarding the update may be provided to the user device, enabling the user device to generate native user interface content that incorporates the update. By causing the user device to generate the native user interface content, for example by providing an instruction that describes the native user interface content in lieu of providing the native user interface content itself, an amount of information sent over a network from the server to the user device may be substantially reduced.

Example embodiments described herein are capable of causing a user device to generate native user interface content for a native application that executes on a server. A native user interface is a user interface that is not created using hypertext markup language (HTML). Native user interface content is content of a native user interface. Content of a native user interface includes one or more native interface elements. A native interface element is an interface element that is defined by a platform on which a native application is configured to run. Examples of an interface element include but are not limited to a menu, a button, a text box, and a list. In some example embodiments, the server is a developer-controlled server. A developer-controlled server is a server that is controlled at least partially by a developer of a native application that executes on the developer-controlled server.

In an aspect, the example techniques differ from traditional thin-client application technologies such as remote desktop. In the traditional thin-client application technologies, UI that is transmitted from a server to a user device is in the form of its graphical representation (e.g., a streaming video displaying the UI, like used for Xbox® cloud gaming) or low-level drawing instructions (e.g., graphics device interface (GDI) for remote desktop, an open graphics library (OpenGL®) application programming interface (API), or an X Windows System windowing system). In accordance with this aspect, UI elements generated by the example embodiments have OS-specific native appearances and behaviors, such as animations on interactions and integration with accessibility technology. These native appearances and behaviors do not need to be modelled on the server or described in the server-to-client traffic. Aspects of the native behaviors occur locally on the client device and hence run with zero latency (e.g., a button getting highlighted on mouse hover).

Example techniques described herein have a variety of benefits as compared to conventional techniques for rendering a user interface for a native application. For instance, the example techniques are capable of causing native interface elements in addition to or in lieu of web-based interface elements to be rendered in the user interface for the native application. Such web-based interface elements may be created (e.g., defined) using HTML code and/or cascade style sheets (CSS) code. The example techniques may be capable of rendering the user interface without using web-based rendering (e.g., without using web-based interface elements). By rendering a native user interface rather than a web-based user interface, the example techniques may retain the full richness of the native application's user interface experience. The example techniques enable a user device to generate and render a native user interface for the native application based on (e.g., based at least on) instructions that are received from a server that executes the native application. For instance, the server may provide the instructions instead of content (e.g., arrays of pixel data and/or extensible markup language (XML) code) of the native user interface, which may reduce an amount of information that is transferred across a network between the server and the user device. By reducing the amount of information transferred between the server and the user device, a cost of rendering the native user interface may be reduced and/or a speed at which the native user interface is rendered may be increased.

By executing the native application on the server, the example techniques enable updated versions of the native application to be accessed by users of the native application without a need for the updated versions to be approved by a third party (e.g., an application store) and without a need for the users to install or execute the updated versions locally on their user devices. Executing the native application on the server increases security of the native application because proprietary and/or sensitive information that is included in the native application need not be provided to the user devices. Executing the native application on the server eliminates a need to employ public API endpoints, such as hypertext transfer protocol (HTTP) endpoints or gRPC remote procedure calls (gRPC) endpoints, to enable the native application to interact with backend services in the cloud. The server innately may have visibility to all user-generated actions with regard to the native application for purposes such as logging, telemetry, and AB testing.

The example techniques may reduce an amount of time and/or resources (e.g., processor cycles, memory, network bandwidth) that is consumed to render a user interface for a native application. By executing the native application on a server and causing a user device to generate native interface content and to render a native user interface that includes the native interface content, the additional time and resources that would have been consumed to provide the native interface content from the server to the user device may be avoided. By reducing the amount of time and/or resources that is consumed by the server and/or the user device, the efficiency of the server and/or the user device may be increased.

A user experience of a user of the native application may be increased, for example, by enabling updates to the native application to be provided to users more quickly than conventional techniques (e.g., by eliminating a need to wait for an application store to approve each update to the native application). The user experience of the user may be increased, for example, by eliminating a need for the user to install updates to the native application locally on the user's user device (e.g., by automatically updating the native application on the server).

A user experience of an information technology (IT) professional who is tasked with providing support for multiple versions of a native application (e.g., and maintaining interoperability between the multiple versions) may be increased, for example, by eliminating a need to provide support for versions other than the newest version. For instance, executing the native application on the server may ensure that all users of the native application use the newest version, thereby eliminating a need to maintain support for the other versions. By ensuring that all users of the native application use the newest version, a number of support tickets that are received by the IT professional regarding issues associated with older versions of the native application that have been fixed in the newest version may be reduced (e.g., eliminated).

FIG. 1 is a block diagram of an example native user interface generation system 100 in accordance with an embodiment. Generally speaking, the native user interface generation system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the native user interface generation system 100 enables (e.g., causes) a user device to generate native user interface content for a native application that executes on a server (e.g., a developer-controlled server). Detail regarding techniques for enabling a user device to generate native user interface content for a native application that executes on a server is provided in the following discussion.

As shown in FIG. 1, the native user interface generation system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IOT) device, or the like. It will be recognized that any one or more of the user devices 102A-102M may communicate with any one or more of the servers 106A-106N.

The first user device 102A is shown to include a native application user interface (UI) rendering agent 112 for illustrative purposes. The native application UI rendering agent 112 is configured to generate native UI content 116 for a native application 110 that executes on the first server(s) 106A. In an example implementation, the native application UI rendering agent 112 receives a UI rendering instruction 120 in lieu of content of a native interface element from the first server(s) 106A. The UI rendering instruction 120 instructs the first user device 102A to generate the content of the native interface element and to incorporate the content of the native interface element into a native user interface 114 associated with the native application 110. The native application UI rendering agent 112 generates the native UI content 116, which includes the content of the native interface element, based at least on the UI rendering instruction 120. The native application UI rendering agent 112 incorporates the native UI content 116, including the content of the native interface element, into the native user interface 114 based at least on the UI rendering instruction 120. The native application UI rendering agent 112 renders the native user interface 114, including the native interface element, on the first user device 102A.

In an example embodiment, the first user device 102A downloads the native application UI rendering agent 112 from an application store (a.k.a. app store) 118 that executes on the Nth server(s) 106N. In an implementation of this embodiment, the native application UI rendering agent 112 is an agent of native application execution logic 108, which runs on the first server(s) 106A. For instance, the native application UI rendering agent 112 may be implemented as a splash screen or a thin client associated with the native application execution logic 108. In another example embodiment, the native application UI rendering agent 112 is incorporated in an operating system that runs on the first user device 102A.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the native user interface generation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include but are not limited to an integrated development environment (IDE) and a web development platform. Examples of an IDE include but are not limited to Microsoft Visual Studio® IDE developed and distributed by Microsoft Corporation; AppCode® IDE, PhpStorm® IDE, Rider® IDE, WebStorm® IDE, etc. developed and distributed by JetBrains s.r.o.; JDeveloper® IDE developed and distributed by Oracle International Corporation; NetBeans® IDE developed and distributed by Sun Microsystems, Inc.; Eclipse™ IDE developed and distributed by Eclipse Foundation; and Android Studio™ IDE developed and distributed by Google LLC and JetBrains s.r.o. Examples of a web development platform include but are not limited to Windows Azure® platform developed and distributed by Microsoft Corporation; Amazon Web Services® platform developed and distributed by Amazon.com, Inc.; Google App Engine® platform developed and distributed by Google LLC; VMWare® platform developed and distributed by VMWare, Inc.; and Force.com® platform developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include the native application execution logic 108 for illustrative purposes. The native application execution logic 108 is configured to cause the first user device 102A to generate the native user interface content 116 for the native application 110. The native application execution logic 108 executes the native application 110. The native application execution logic 108 causes the native user interface 114 of the native application 110 to be rendered on the first user device 102A by providing the user interface rendering instruction 120 to the first user device 102A. The native application execution logic 108 provides the UI rendering instruction 120 in lieu of the content of the native interface element, which is described above with regard to the native application UI rendering agent 112. The native application execution logic 108 providing the UI rendering instruction 120 to the first user device 102A instructs (e.g., causes) the first user device 102A to generate the content of the native interface element and to incorporate the content of the native interface element into the native user interface 114. The native UI content 116 includes the content of the native interface element. Accordingly, the native application execution logic 108 providing the UI rendering instruction 120 to the first user device 102A may cause the first user device 102A to generate the native UI content 116 and to incorporate the native UI content 116 into the native user interface 114. In the embodiment of FIG. 1, the first server(s) 106A are developer-controlled, meaning that the first server(s) 106A are controlled by a developer of the native application 110.

The Nth server(s) 106N are shown to include the application store 118 for illustrative purposes. The application store 118 is a digital distribution platform for applications. Each of the applications may be configured to run on a particular operating system, though the scope of the example embodiments is not limited in this respect. In an example implementation, the application store 118 enables users of the user devices 102A-102M to search and review titles of the applications. A user selecting a desired application from among the applications may cause the application store 118 to provide a native application UI rendering agent associated with the desired application to a user device of the user. The application store 118 may require payment of a fee as a prerequisite for sending the native application UI rendering agent of the desired application to the user device of the user.

The native application UI rendering agent 112 may be implemented in various ways to generate the native UI content 116 for the native application 110, including being implemented in hardware, software, firmware, or any combination thereof. The native application execution logic 108 may be implemented in various ways to causing the first user device 102A to generate the native UI content 116 for the native application 110, including being implemented in hardware, software, firmware, or any combination thereof. For example, the native application UI rendering agent 112 and/or the native application execution logic 108 may be implemented as computer program code configured to be executed in one or more processors. In another example, at least a portion of the native application UI rendering agent 112 and/or the native application execution logic 108 may be implemented as hardware logic/electrical circuitry. For instance, at least a portion of the native application UI rendering agent 112 and/or the native application execution logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the native application execution logic 108 may be (or may be included in) a developer tool and/or a cloud computing program, though the scope of the example embodiments is not limited in this respect.

The native application UI rendering agent 112 is shown to be incorporated in the first user device 102A for illustrative purposes and is not intended to be limiting. It will be recognized that the native application UI rendering agent 112 may be incorporated in any one or more of the user devices 102A-102M to generate native UI content of the native application 110 thereon. For instance, each of the user devices 102A-102M may include a respective instance of the native application UI rendering agent 112 to generate respective native UI content of the native application 110 that is associated with a user of the respective user device.

The native application execution logic 108 is shown to be incorporated in the first server(s) 106A for illustrative purposes and is not intended to be limiting. It will be recognized that the native application execution logic 108 may be incorporated in any one or more of the servers 106A-106N to cause any one or more of the user devices 102A-102M to generate respective native UI content of the native application 110 thereon. For instance, the native application execution logic 108 may provide a first UI rendering instruction to the first user device 102A to cause the first user device 102A to generate first native UI content, which is associated with a first user of the first user device 102A, thereon. The native application execution logic 108 may provide a second UI rendering instruction to the second user device 102B to cause the second user device 102B to generate second native UI content, which is associated with a second user of the second user device 102B, thereon, and so on.

Figure 2:
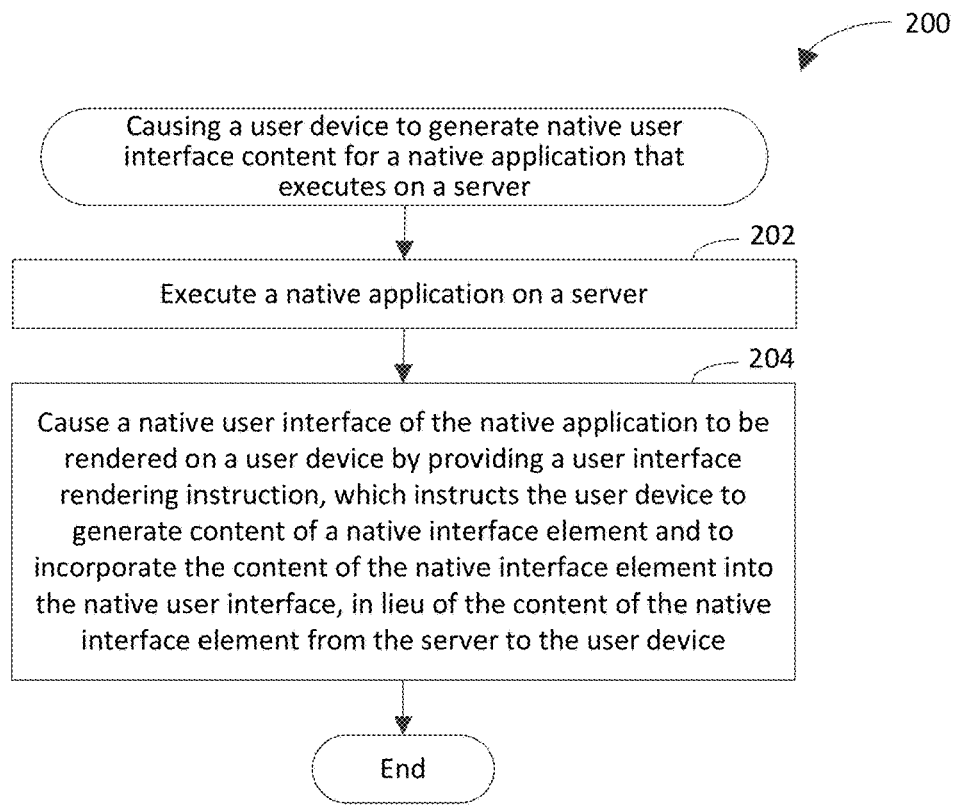
FIGS. 2-3 depict flowcharts of example methods for causing a user device to generate native user interface content for a native application that executes on a server in accordance with embodiments.
Figure 3:
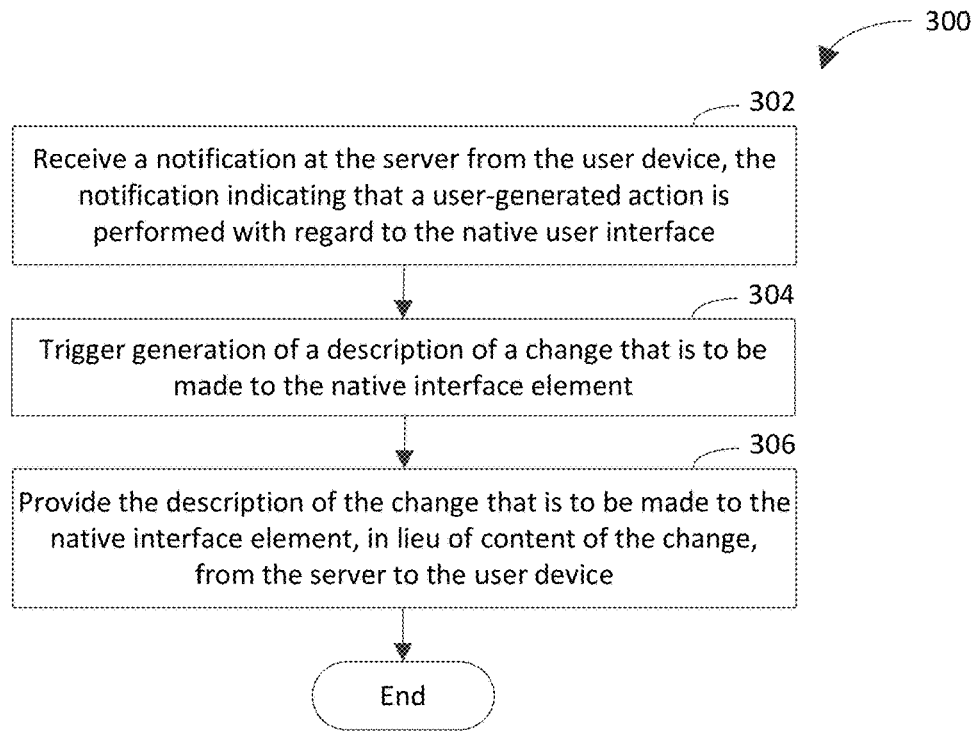
Figure 4:
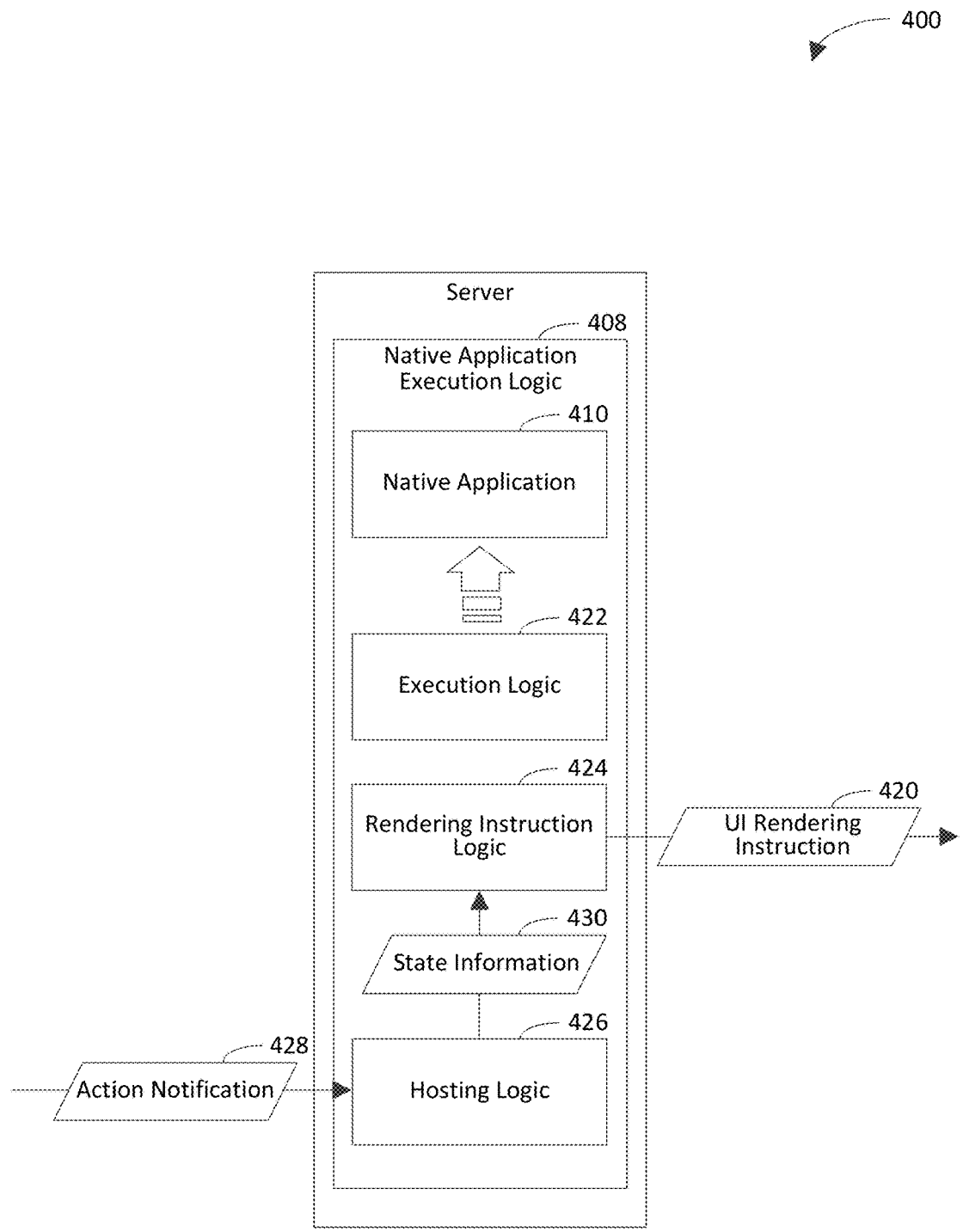
FIG. 4 is a block diagram of an example server in accordance with an embodiment.

FIGS. 2-3 depict flowcharts 200 and 300 of example methods for causing a user device to generate native user interface content for a native application that executes on a server in accordance with embodiments. Flowcharts 200 and 300 may be performed by the first server(s) 106A shown in FIG. 1, for example. For illustrative purposes, flowcharts 200 and 300 are described with respect to a server 400 shown in FIG. 4, which is an example implementation of the first server(s) 106A. As shown in FIG. 4, the server 400 includes native application execution logic 408. The native application execution logic 408 includes execution logic 422, rendering instruction logic 424, and hosting logic 426. Further structural and operational embodiments will be apparent to persons skilled in the relevant art(s) based on the discussion regarding flowcharts 200 and 300.

As shown in FIG. 2, the method of flowchart 200 begins at step 202. In step 202, a native application is executed on a server. In an example implementation, the execution logic 422 executes a native application 410 on the server 400.

At step 204, a native user interface of the native application is caused to be rendered on a user device, which is coupled to the server via a network, by providing a user interface rendering instruction, which instructs (e.g., causes) the user device to generate content of a native interface element and to incorporate the content of the native interface element into the native user interface, in lieu of the content of the native interface element from the server to the user device. In an aspect, the user interface rendering instruction defines the content of the native interface element at a user interface level (e.g., describing shapes defined by a platform with which the native application is associated), rather than at a graphics card level (e.g., describing individual pixels and/or lines that are combined to create a shape). Examples of an interface element include but are not limited to a list, a menu, text, a virtual button, and a widget. For example, a native widget may specify "change tab 3 to become disabled" or "update calendar 15 to show the month February 2023." In an example implementation, the rendering instruction logic 424 causes the native user interface of the native application to be rendered on the user device by providing a UI rendering instruction 420 in lieu of the content of the native interface element to the user device. For instance, the native interface element may be supplied by a native UI system of the user device. In an example, the native interface element may be defined by an operating system of the user device. In another example, the native interface element may be drawn in accordance with a custom draw feature of the operating system of the user device. In accordance with this implementation, the UI rendering instruction 420 causes the user device to generate the content of the native interface element and to incorporate the content of the native interface element into the native user interface.

In an example embodiment, causing the native user interface to be rendered at step 204 includes instructing the user device to generate the content of the native interface element and to incorporate the content of the native interface element into the native user interface without using a web view. A web view (a.k.a. embedded browser control) is a web browser that is embedded in a native application and that is configured to display web content. Web content is content that is published on a website. Examples of content include but are not limited to text, an animation, an image, audio, and video.

In another example embodiment, the native interface element enables a user of the native application to access a feature of another application, which is different from the native application. For instance, the user interacting with the native interface element may cause the feature to become accessible to the user via the native user interface. In an aspect, the feature may provide access to information, such as photos, contacts, text messages, or emails of the user. In accordance with this aspect, the information may be stored on the user device. In another aspect, the feature may enable the user to make a phone call (e.g., a voice over Internet Protocol (VoIP) call or a cellular call).

In some example embodiments, one or more steps 202 and/or 204 of flowchart 200 may not be performed. Moreover, steps in addition to or in lieu of steps 202 and/or 204 may be performed. For instance, in an example embodiment, the method of flowchart 200 further includes hosting a stateful representation of the native application, including a stateful representation of the native user interface, on the server. The stateful representation of the native application includes a state of the native application. The state of the native application includes information regarding events that previously occurred with regard to the native application. An event that occurs with regard to the native application is an action or occurrence that is recognized by the native application. The event may occur asynchronously from an environment that is external to the native application, synchronously from the aforementioned environment, asynchronously from within the native application, or synchronously from within the native application. Examples of an event include but are not limited to an interaction of a user with the native application, a timer timing out, and completion of a task (e.g., by the native application or by an operating system on which the native application executes). Interaction of the user with the native application may include performance of a keystroke or a mouse click by the user with regard to an interface element in the native user interface of the native application. In an example implementation, the hosting logic 426 hosts a stateful representation of the native application 410. The hosting logic 426 generates state information 430 to indicate a state of the native application 410. In an aspect of this implementation, the hosting logic 426 identifies the state of the native application 410 at successive time instances. In accordance with this aspect, the hosting logic 426 identifies changes of the state over the successive time instances and updates the state information 430 to indicate the changes.

In another example embodiment, the method of flowchart 200 further includes hosting (e.g., concurrently hosting) multiple stateful representations of the native application on the server. The multiple stateful representations correspond to respective users of the native application. In accordance with this embodiment, the multiple stateful representations include second stateful representations of respective user interfaces of the native application that correspond to the respective users. In an aspect, the stateful representations of the native application correspond to respective instances of the native application that are used by the respective users. In accordance with this aspect, the second stateful representations of the respective user interfaces correspond to the respective instances of the native application. For example, a first user clicking on button 7 in the corresponding user interface may result in a change to the state of the first user's instance of the native application without affecting the states of the other users' instances of the native application. In accordance with this example, the user interfaces of the other instances of the native application may not include a button 7, or the button 7 in those user interfaces may be different from the button 7 in the first user's user interface. In an example implementation, the hosting logic 426 hosts the stateful representations of the native application that correspond to the respective users of the native application.

In yet another example embodiment, the method of flowchart 200 includes one or more of the steps shown in flowchart 300 of FIG. 3. As shown in FIG. 3, the method of flowchart 300 begins at step 302. In step 302, a notification is received at the server from the user device. The notification indicates that a user-generated action is performed with regard to the native user interface. In an aspect, the user-generated action is an interaction of a user of the native application with the native user interface. In accordance with this aspect, the notification describes the interaction of the user with the native user interface. In an example implementation, the hosting logic 426 receives an action notification 428 from the user device. The action notification 428 indicates that the user-generated action has been performed with regard to the native user interface.

At step 304, generation of a description of a change that is to be made to the native interface element is triggered (e.g., based at least on receipt of the notification). In an example implementation, the hosting logic 428 triggers generation of the description of the change that is to be made to the native interface element as a result of receiving the action notification 428. In an aspect of this implementation, the hosting logic 428 configures (e.g., update) the state information 430 to indicate occurrence of the user-generated action. For instance, the state information 430 may be configured to include a description of the user-generated action (e.g., a type of input from the user and/or an interface element at which the user-generated action is directed). In accordance with this implementation, the hosting logic 426 provides the state information 430, including an indication of the occurrence of the user-generated action, to the rendering instruction logic 424, which triggers the rendering instruction logic 424 to generate the description of the change that is to be made to the native interface element.

At step 306, the description of the change that is to be made to the native interface element is provided, in lieu of content of the change, to the user device. In an aspect, step 204 shown in FIG. 2 includes step 306. In an example implementation, the rendering instruction logic 424 provides the description of the change that is to be made to the native interface element, in lieu of the content of the change, to the user device. For instance, the rendering instruction logic 424 may configure the UI rendering instruction 420 to include the description of the change that is to be made to the native interface element. For example, the description of the change that is to be made to the native interface element may indicate (e.g., specify) that text content of the interface element is to be changed to a designated string or that a new event handler is to be added on the interface element.

In an aspect of this embodiment, the notification is received at step 302 via a WebSocket connection. A WebSocket connection is a connection that operates in accordance with the WebSocket protocol. The WebSocket protocol provides full-duplex communication channels over a single transmission control protocol (TCP) connection. The WebSocket protocol was standardized by the Internet Engineering Task Force (IETF) as request for comments (RFC) 6455 in 2011. WebSockets is an example API specification that enables applications to use the WebSocket protocol. In accordance with this aspect, the description of the change is provided to the user device at step 306 via the WebSocket connection.

In another aspect of this embodiment, the notification is received at step 302 via a transmission control protocol (TCP) connection. In accordance with this aspect, the description of the change is provided to the user device at step 306 via the TCP connection.

It will be recognized that the server 400 may not include one or more of the native application execution logic 408, the execution logic 422, the rendering instruction logic 424, and/or the hosting logic 426. Furthermore, the server 400 may include components in addition to or in lieu of the native application execution logic 408, the execution logic 422, the rendering instruction logic 424, and/or the hosting logic 426.

Figure 5:
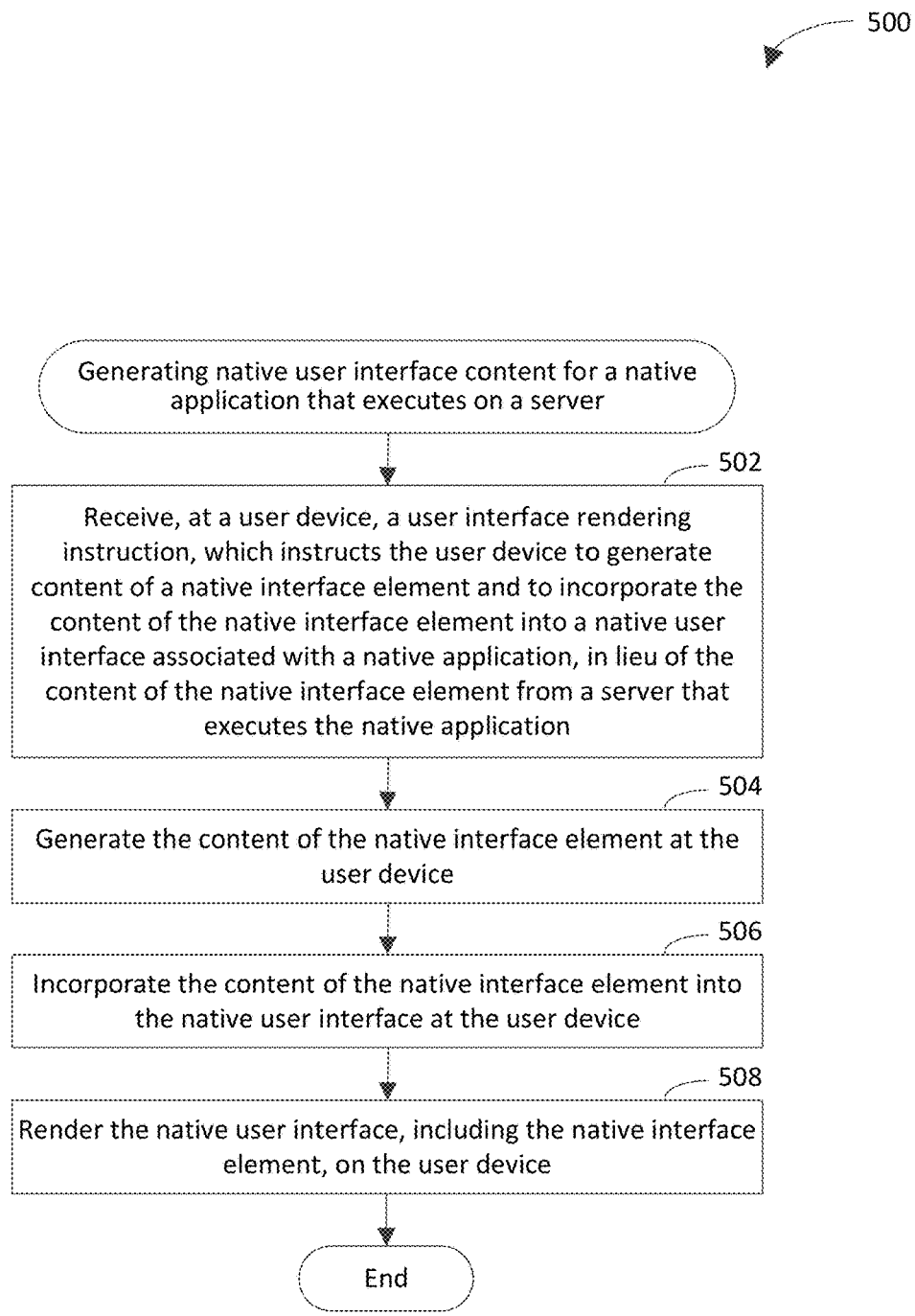
FIG. 5 depicts a flowchart of an example method for generating native user interface content for a native application that executes on a server in accordance with an embodiment.
Figure 6:
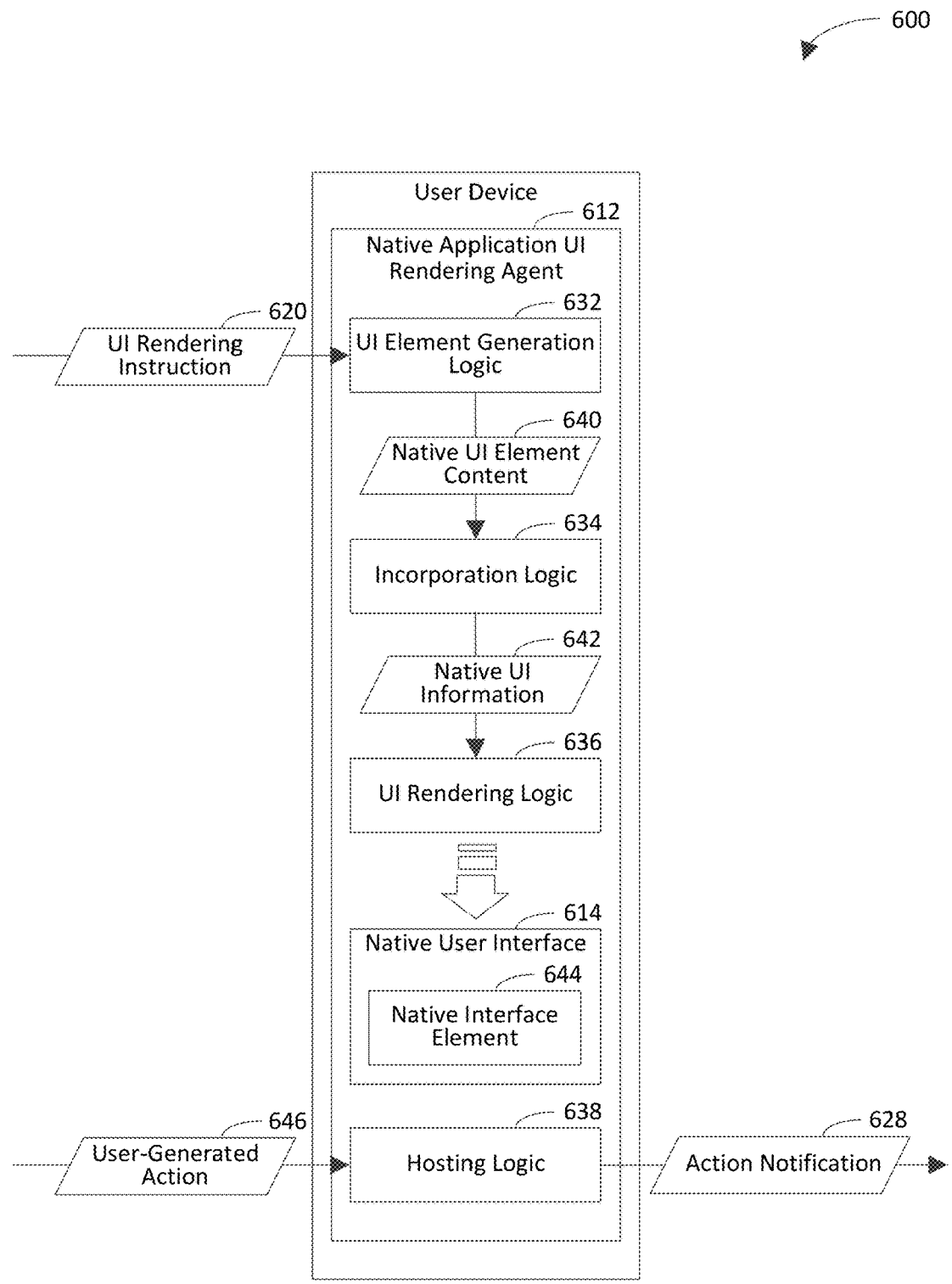
FIG. 6 is a block diagram of an example user device in accordance with an embodiment.

FIG. 5 depicts a flowchart 500 of an example method for generating native user interface content for a native application that executes on a server in accordance with an embodiment. Flowchart 500 may be performed by the first user device 102A shown in FIG. 1, for example. For illustrative purposes, flowchart 500 is described with respect to a user device 600 shown in FIG. 6, which is an example implementation of the first user device 102A. As shown in FIG. 6, the user device 600 includes native application UI rendering agent 612. The native application UI rendering agent 612 includes UI element generation logic 632, incorporation logic 634, UI rendering logic 636, and hosting logic 638. Further structural and operational embodiments will be apparent to persons skilled in the relevant art(s) based on the discussion regarding flowchart 500.

As shown in FIG. 5, the method of flowchart 500 begins at step 502. In step 502, a user interface rendering instruction, which instructs a user device to generate content of a native interface element and to incorporate the content of the native interface element into a native user interface associated with a native application, is received in lieu of the content of the native interface element at the user device from a server that executes the native application and that is coupled to the user device via a network. In an example implementation, the UI element generation logic 632 receives a UI rendering instruction 620 in lieu of content of a native interface element 644 from the server. The UI rendering instruction 620 instructs the user device 600 to generate the content of the native interface element 644 and to incorporate the content of the native interface element 644 into a native user interface 614 associated with the native application.

In an example embodiment, the user interface rendering instruction is received in lieu of the content of the native interface element at step 502 without using a web view.

At step 504, the content of the native interface element is generated at the user device (e.g., based at least on the user interface rendering instruction). In an example implementation, the UI element generation logic 632 generates native UI element content 640, which includes the content of the native interface element 644, based at least on the UI rendering instruction 620 (e.g., based at least on the UI rendering instruction 620 instructing the user device 600 to generate the content of the native interface element 644).

In an example embodiment, the native interface element enables a user of the native application to access a feature of another application, which is different from the native application.

At step 506, the content of the native interface element is incorporated into the native user interface at the user device (e.g., based at least on the user interface rendering instruction). In an example implementation, the incorporation logic 634 incorporates the native UI element content 640, including the content of the native interface element 644, into the native user interface 614 based at least on the UI rendering instruction 620 (e.g., based at least on the UI rendering instruction 620 instructing the user device 600 to incorporate the content of the native interface element 644 into the native user interface 614). The incorporation logic 634 generates native UI information 642, which represents (e.g., defines) the native user interface 614, including the native interface element(s) 644, based at least in part on the native UI element content 640.

At step 508, the native user interface, including the native interface element, is rendered on the user device. In an example implementation, the UI rendering logic 636 renders the native user interface 614, including the native interface element 644, on the user device 600.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, the method of flowchart 500 further includes detecting performance of a user-generated action with regard to the native user interface. In an aspect, the user-generated action is an interaction of a user of the native application with the native user interface. In an example implementation, the hosting logic 638 detects performance of a user-generated action 646 with regard to the native user interface 614. In accordance with this embodiment, the method of flowchart 500 further includes instructing (e.g., causing) the server to update a state of a stateful representation of the native application, including a stateful representation of the native user interface, by providing an action notification, which describes the user-generated action that is performed with regard to the native user interface, from the user device to the server. In an example implementation, the hosting logic 638 instructs the server to update a state of a stateful representation of the native application, including a stateful representation of the native user interface 614, by providing an action notification 628, which describes the user-generated action 646 that is performed with regard to the native user interface 614, to the server.

In an aspect of this embodiment, the user interface rendering instruction is received at step 502 via a WebSocket connection. In accordance with this aspect, the action notification is provided from the user device to the server via the WebSocket connection.

In an aspect of this embodiment, the user interface rendering instruction is received at step 502 via a transmission control protocol (TCP) connection. In accordance with this aspect, the action notification is provided from the user device to the server via the TCP connection.

It will be recognized that the user device 600 may not include one or more of the native application UI rendering agent 612, the UI element generation logic 632, the incorporation logic 634, the UI rendering logic 636, and/or the hosting logic 638. Furthermore, the user device 600 may include components in addition to or in lieu of the native application UI rendering agent 612, the UI element generation logic 632, the incorporation logic 634, the UI rendering logic 636, and/or the hosting logic 638.

Figure 7:
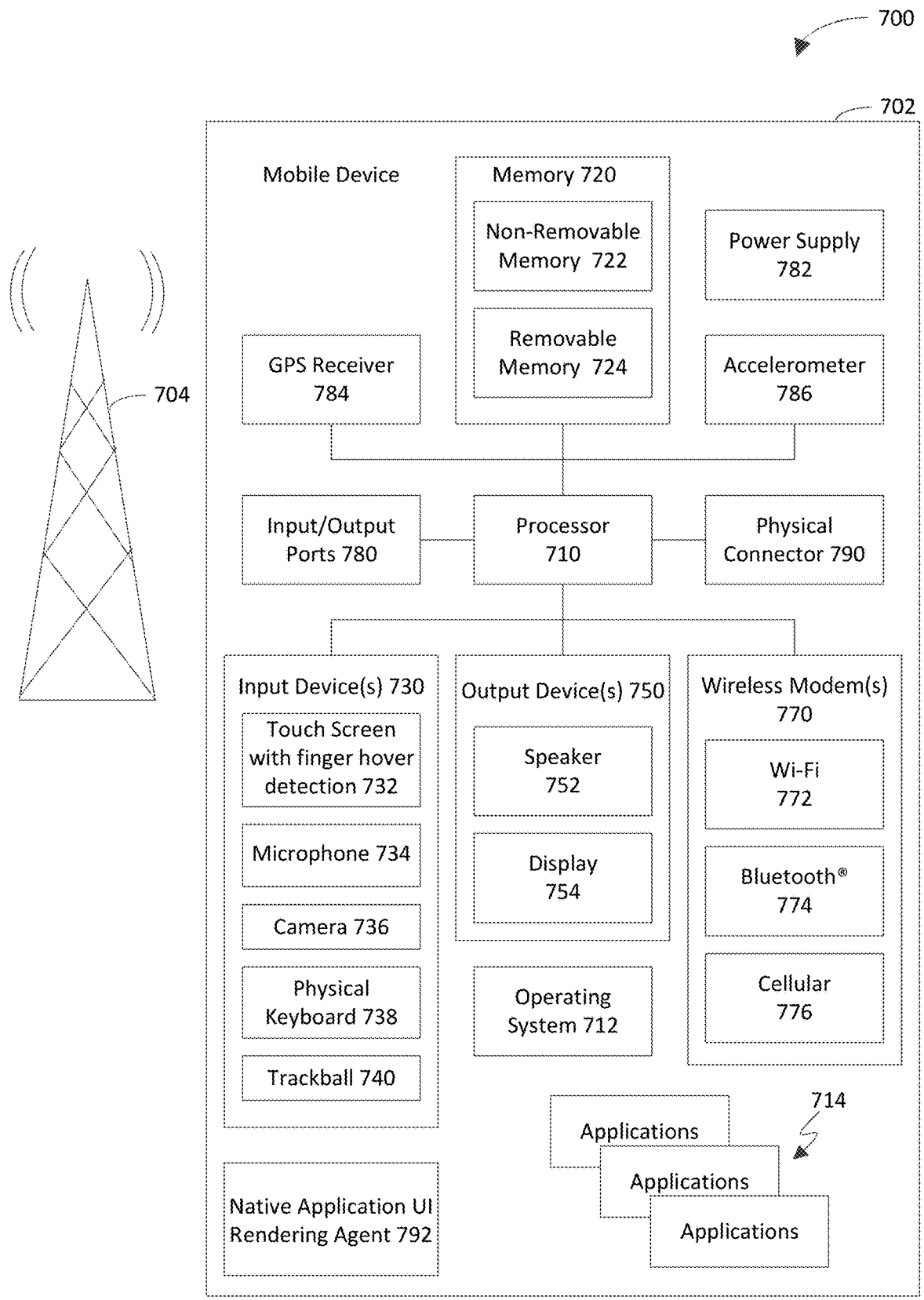
FIG. 7 is a system diagram of an example mobile device in accordance with an embodiment.

FIG. 7 is a system diagram of an example mobile device 700 including a variety of optional hardware and software components, shown generally as 702. Any components 702 in the mobile device may communicate with any other component, though not all connections are shown, for ease of illustration. The mobile device 700 may be any of a variety of computing devices (e.g., cell phone, smartphone, handheld computer, Personal Digital Assistant (PDA), etc.) and may allow wireless two-way communications with one or more mobile communications networks 704, such as a cellular or satellite network, or with a local area or wide area network.

The mobile device 700 includes a processor 710 (e.g., signal processor, microprocessor, ASIC, or other control and processing logic circuitry) for performing such tasks as signal coding, data processing, input/output processing, power control, and/or other functions. An operating system 712 may control the allocation and usage of the components 702 and support for one or more applications 714 (a.k.a. application programs). The applications 714 may include common mobile computing applications (e.g., email applications, calendars, contact managers, web browsers, messaging applications) and any other computing applications (e.g., word processing applications, mapping applications, media player applications).

The mobile device 700 includes native application UI rendering agent 792, which is operable in a manner similar to the native application UI rendering agent 112 described above with reference to FIG. 1 and/or the native application UI rendering agent 612 described above with reference to FIG. 6.

The mobile device 700 includes memory 720. The memory 720 may include non-removable memory 722 and/or removable memory 724. The non-removable memory 722 may include random access memory (RAM), read-only memory (ROM), flash memory, a hard disk, or other well-known memory storage technologies. The removable memory 724 may include flash memory or a Subscriber Identity Module (SIM) card, which is well known in Global System for Mobile Communications (GSM) systems, or other well-known memory storage technologies, such as "smart cards." The memory 720 may store data and/or code for running the operating system 712, the applications 714, and the native application UI rendering agent 792. Example data may include web pages, text, images, sound files, video data, or other data sets to be sent to and/or received from one or more network servers or other devices via one or more wired or wireless networks. Memory 720 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 700 may support one or more input devices 730, such as a touch screen 732, microphone 734, camera 736, physical keyboard 738 and/or trackball 740 and one or more output devices 750, such as a speaker 752 and a display 754. Touch screens, such as the touch screen 732, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 732 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 732 and display 754 may be combined in a single input/output device. The input devices 730 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 may include speech-recognition software as part of a voice control interface that allows a user to operate the mobile device 700 via voice commands. Furthermore, the mobile device 700 may include input devices and software that allows for user interaction via a user's spatial gestures, such as detecting and interpreting gestures to provide input to a gaming application.

Wireless modem(s) 770 may be coupled to antenna(s) (not shown) and may support two-way communications between the processor 710 and external devices, as is well understood in the art. The modem(s) 770 are shown generically and may include a cellular modem 776 for communicating with the mobile communication network 704 and/or other radio-based modems (e.g., Bluetooth® 774 and/or Wi-Fi 772). At least one of the wireless modem(s) 770 is typically configured for communication with one or more cellular networks, such as a GSM network for data and voice communications within a single cellular network, between cellular networks, or between the mobile device and a public switched telephone network (PSTN).

The mobile device may further include at least one input/output port 780, a power supply 782, a satellite navigation system receiver 784, such as a Global Positioning System (GPS) receiver, an accelerometer 786, and/or a physical connector 790, which may be a universal serial bus (USB) port, IEEE 1394 (FireWire) port, and/or RS-232 port. The illustrated components 702 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the native application execution logic 108, the native application UI rendering agent 112, the native application execution logic 408, the execution logic 422, the rendering instruction logic 424, the hosting logic 426, the native application UI rendering agent 612, the UI element generation logic 632, the incorporation logic 634, the UI rendering logic 636, the hosting logic 638, flowchart 200, flowchart 300, and/or flowchart 500 may be implemented in hardware, software, firmware, or any combination thereof.

For example, any one or more of the native application execution logic 108, the native application UI rendering agent 112, the native application execution logic 408, the execution logic 422, the rendering instruction logic 424, the hosting logic 426, the native application UI rendering agent 612, the UI element generation logic 632, the incorporation logic 634, the UI rendering logic 636, the hosting logic 638, flowchart 200, flowchart 300, and/or flowchart 500 may be implemented, at least in part, as computer program code configured to be executed in one or more processors.

In another example, any one or more of the native application execution logic 108, the native application UI rendering agent 112, the native application execution logic 408, the execution logic 422, the rendering instruction logic 424, the hosting logic 426, the native application UI rendering agent 612, the UI element generation logic 632, the incorporation logic 634, the UI rendering logic 636, the hosting logic 638, flowchart 200, flowchart 300, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
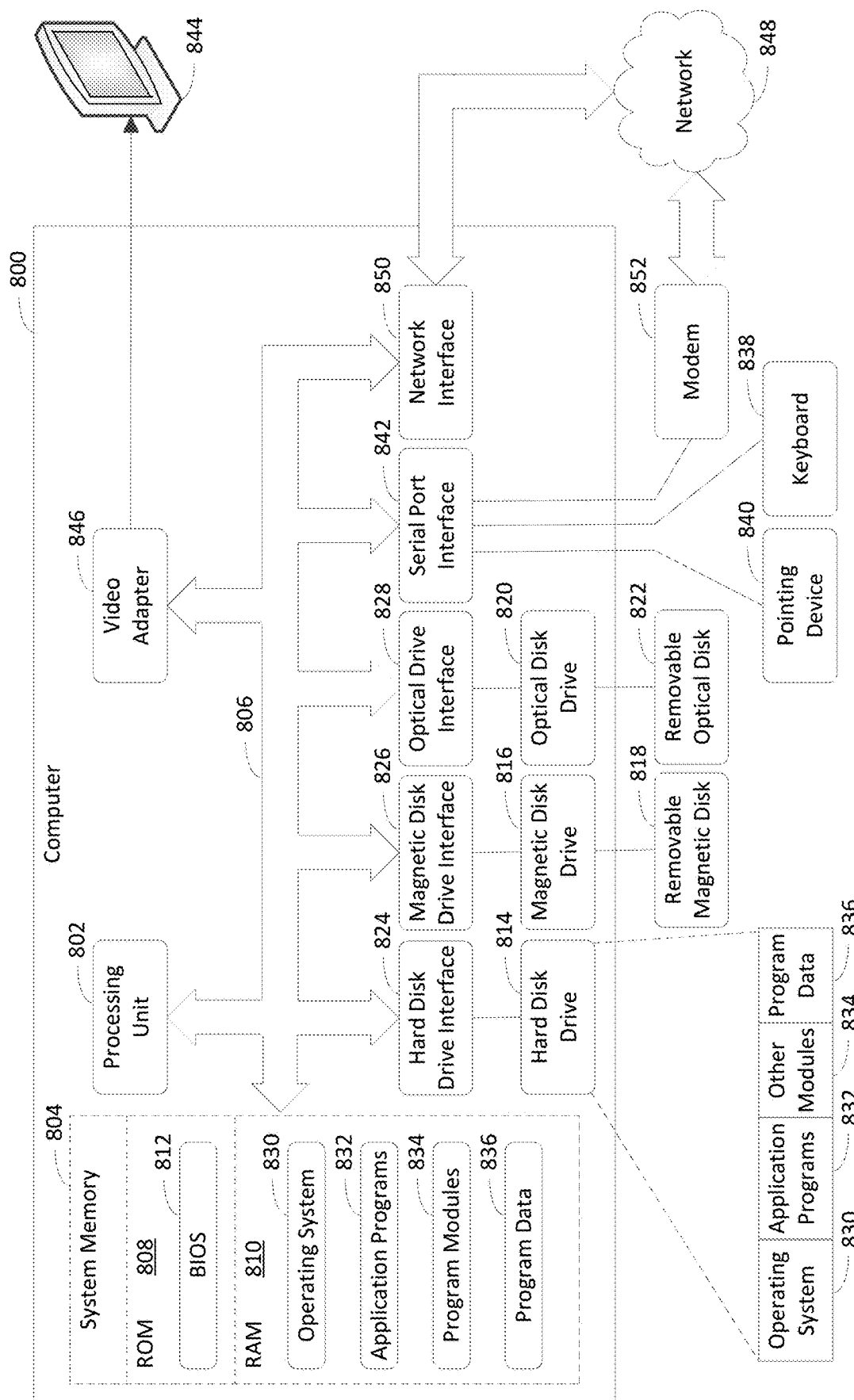
FIG. 8 depicts an example computer in which embodiments may be implemented.

II. Further Discussion of Some Example Embodiments (A1) An example server (FIG. 1, 106A; FIG. 4, 400; FIG. 8, 800) comprises memory (FIG. 8, 804, 808, 810) and a processing system (FIG. 8, 802) coupled to the memory. The processing system is configured to execute (FIG. 2, 202) a native application (FIG. 1, 110; FIG. 4, 410) on the server. The processing system is further configured to cause (FIG. 2, 204) a native user interface (FIG. 1, 114) of the native application to be rendered on a user device (FIG. 1, 102A; FIG. 6, 600; FIG. 7, 702), which is coupled to the server via a network, (FIG. 1, 104) by providing a user interface rendering instruction (FIG. 1, 120; FIG. 4, 420), which instructs the user device to generate content of a native interface element (FIG. 1, 116; FIG. 6, 644) and to incorporate the content of the native interface element into the native user interface, in lieu of the content of the native interface element from the server to the user device.

(A2) In the example server of A1, wherein the processing system is configured to: instruct the user device to generate the content of the native interface element and to incorporate the content of the native interface element into the native user interface without using a web view.

(A3) In the example server of any of A1-A2, wherein the processing system is further configured to: host a stateful representation of the native application, including a stateful representation of the native user interface, on the server.

(A4) In the example server of any of A1-A3, wherein the processing system is further configured to: host a plurality of stateful representations of the native application, which correspond to a plurality of respective users of the native application, on the server, the plurality of stateful representations including a second plurality stateful representations of a plurality of respective user interfaces of the native application that correspond to the plurality of respective users.

(A5) In the example server of any of A1-A4, wherein the processing system is configured to: receive a notification from the user device, the notification indicating that a user-generated action is performed with regard to the native user interface; based at least on receipt of the notification, trigger generation of a description of a change that is to be made to the native interface element; and provide the description of the change that is to be made to the native interface element, in lieu of content of the change, from the server to the user device.

(A6) In the example server of any of A1-A5, wherein the processing system is configured to: receive the notification from the user device via a WebSocket connection; and provide the description of the change that is to be made to the native interface element, in lieu of content of the change, to the user device via the WebSocket connection.

(A7) In the example server of any of A1-A6, wherein the processing system is configured to: receive the notification from the user device via a transmission control protocol (TCP) connection; and provide the description of the change that is to be made to the native interface element, in lieu of content of the change, to the user device via the TCP connection.

(A8) In the example server of any of A1-A7, wherein the native interface element enables a user of the native application to access a feature of another application, which is different from the native application.

(B1) An example user device (FIG. 1, 102A; FIG. 6, 600; FIG. 7, 702; FIG. 8, 800) comprises memory (FIG. 7, 720, 722, 724; FIG. 8, 804, 808, 810) and a processing system (FIG. 7, 710; FIG. 8, 802) coupled to the memory. The processing system is configured to receive (FIG. 5, 502) a user interface rendering instruction (FIG. 1, 120; FIG. 6, 620), which instructs the user device to generate content of a native interface element (FIG. 1, 116; FIG. 6, 644) and to incorporate the content of the native interface element into a native user interface (FIG. 1, 114; FIG. 6, 614) associated with a native application (FIG. 1, 110), in lieu of the content of the native interface element from a server (FIG. 106A; FIG. 4, 400) that executes the native application and that is coupled to the user device via a network (FIG. 1, 104). The processing system is further configured to, based at least on the user interface rendering instruction, generate (FIG. 5, 504) the content of the native interface element at the user device. The processing system is further configured to, based at least on the user interface rendering instruction, incorporate (FIG. 5, 506) the content of the native interface element into the native user interface at the user device. The processing system is further configured to render (FIG. 5, 508) the native user interface, including the native interface element, on the user device.

(B2) In the example user device of B1, wherein the processing system is configured to: receive the user interface rendering instruction, in lieu of the content of the native interface element, from the server without using a web view.

(B3) In the example user device of any of B1-B2, wherein the processing system is further configured to: detect performance of a user-generated action with regard to the native user interface; and instruct the server to update a state of a stateful representation of the native application, including a stateful representation of the native user interface, by providing an action notification, which describes the user-generated action that is performed with regard to the native user interface, from the user device to the server.

(B4) In the example user device of any of B1-B3, wherein the processing system is configured to: receive the user interface rendering instruction in lieu of the content of the native interface element from the server via a WebSocket connection; and provide the action notification from the user device to the server via the WebSocket connection.

(B5) In the example user device of any of B1-B4, wherein the processing system is configured to: receive the user interface rendering instruction in lieu of the content of the native interface element from the server via a transmission control protocol (TCP) connection; and provide the action notification from the user device to the server via the TCP connection.

(B6) In the example user device of any of B1-B5, wherein the native interface element enables a user of the native application to access a feature of another application, which is different from the native application.

(C1) A first example method is implemented by a server (FIG. 1, 106A; FIG. 4, 400; FIG. 8, 800). The method comprises executing (FIG. 2, 202) a native application (FIG. 1, 110; FIG. 4, 410) on the server. The method further comprises causing (FIG. 2, 204) a native user interface (FIG. 1, 114) of the native application to be rendered on a user device (FIG. 1, 102A; FIG. 6, 600; FIG. 7, 702), which is coupled to the server via a network, (FIG. 1, 104) by providing a user interface rendering instruction (FIG. 1, 120; FIG. 4, 420), which instructs the user device to generate content of a native interface element (FIG. 1, 116; FIG. 6, 644) and to incorporate the content of the native interface element into the native user interface, in lieu of the content of the native interface element from the server to the user device.

(C2) In the example method of C1, wherein causing the native user interface to be rendered comprises: instructing the user device to generate the content of the native interface element and to incorporate the content of the native interface element into the native user interface without using a web view.

(C3) In the example method of any of C1-C2, further comprising: hosting a stateful representation of the native application, including a stateful representation of the native user interface, on the server.

(C4) In the example method of any of C1-C3, further comprising: hosting a plurality of stateful representations of the native application, which correspond to a plurality of respective users of the native application, on the server, the plurality of stateful representations including a second plurality stateful representations of a plurality of respective user interfaces of the native application that correspond to the plurality of respective users.

(C5) In the example method of any of C1-C4, further comprising: receiving a notification at the server from the user device, the notification indicating that a user-generated action is performed with regard to the native user interface; and based at least on receipt of the notification, triggering generation of a description of a change that is to be made to the native interface element; wherein providing the user interface rendering instruction comprises: providing the description of the change that is to be made to the native interface element, in lieu of content of the change, from the server to the user device.

(C6) In the example method of any of C1-C5, wherein receiving the notification comprises: receiving the notification at the server from the user device via a WebSocket connection; and wherein providing the user interface rendering instruction comprises: providing the description of the change that is to be made to the native interface element, in lieu of content of the change, from the server to the user device via the WebSocket connection.

(C7) In the example method of any of C1-C6, wherein receiving the notification comprises: receiving the notification at the server from the user device via a transmission control protocol (TCP) connection; and wherein providing the user interface rendering instruction comprises: providing the description of the change that is to be made to the native interface element, in lieu of content of the change, from the server to the user device via the TCP connection.

(C8) In the example method of any of C1-C7, wherein the native interface element enables a user of the native application to access a feature of another application, which is different from the native application.

(D1) A second example method is implemented by a user device (FIG. 1, 102A; FIG. 6, 600; FIG. 7, 702; FIG. 8, 800). The method comprises receiving (FIG. 5, 502), at the user device, a user interface rendering instruction (FIG. 1, 120; FIG. 6, 620), which instructs the user device to generate content of a native interface element (FIG. 1, 116; FIG. 6, 644) and to incorporate the content of the native interface element into a native user interface (FIG. 1, 114; FIG. 6, 614) associated with a native application (FIG. 1, 110), in lieu of the content of the native interface element from a server (FIG. 106A; FIG. 4, 400) that executes the native application and that is coupled to the user device via a network (FIG. 1, 104). The method further comprises, based at least on the user interface rendering instruction, generating (FIG. 5, 504) the content of the native interface element at the user device. The method further comprises, based at least on the user interface rendering instruction, incorporating (FIG. 5, 506) the content of the native interface element into the native user interface at the user device. The method further comprises rendering (FIG. 5, 508) the native user interface, including the native interface element, on the user device.

(D2) In the example method of D1, wherein receiving the user interface rendering instruction comprises: receiving, at the user device, the user interface rendering instruction, in lieu of the content of the native interface element, from the server without using a web view.

(D3) In the example method of any of D1-D2, further comprising: detecting performance of a user-generated action with regard to the native user interface; and instructing the server to update a state of a stateful representation of the native application, including a stateful representation of the native user interface, by providing an action notification, which describes the user-generated action that is performed with regard to the native user interface, from the user device to the server.

(D4) In the example method of any of D1-D3, wherein receiving the user interface rendering instruction comprises: receiving, at the user device, the user interface rendering instruction in lieu of the content of the native interface element from the server via a WebSocket connection; and wherein instructing the server to update the state of the stateful representation of the native application comprises: providing the action notification from the user device to the server via the WebSocket connection.

(D5) In the example method of any of D1-D4, wherein receiving the user interface rendering instruction comprises: receiving, at the user device, the user interface rendering instruction in lieu of the content of the native interface element from the server via a transmission control protocol (TCP) connection; and wherein instructing the server to update the state of the stateful representation of the native application comprises: providing the action notification from the user device to the server via the TCP connection.

(D6) In the example method of any of D1-D5, wherein the native interface element enables a user of the native application to access a feature of another application, which is different from the native application.

(E1) A first example computer program product (FIG. 7, 724; FIG. 8, 818, 822) comprising a computer-readable storage medium having instructions recorded thereon for enabling a server (FIG. 1, 106A; FIG. 4, 400; FIG. 8, 800) to perform operations. The operations comprise executing (FIG. 2, 202) a native application (FIG. 1, 110; FIG. 4, 410) on the server. The operations further comprise causing (FIG. 2, 204) a native user interface (FIG. 1, 114) of the native application to be rendered on a user device (FIG. 1, 102A; FIG. 6, 600; FIG. 7, 702), which is coupled to the server via a network, (FIG. 1, 104) by providing a user interface rendering instruction (FIG. 1, 120; FIG. 4, 420), which instructs the user device to generate content of a native interface element (FIG. 1, 116; FIG. 6, 644) and to incorporate the content of the native interface element into the native user interface, in lieu of the content of the native interface element from the server to the user device.

(F1) A second example computer program product (FIG. 7, 724; FIG. 8, 818, 822) comprising a computer-readable storage medium having instructions recorded thereon for enabling a user device (FIG. 1, 102A; FIG. 6, 600; FIG. 7, 702; FIG. 8, 800) to perform operations. The operations comprise receiving (FIG. 5, 502), at the user device, a user interface rendering instruction (FIG. 1, 120; FIG. 6, 620), which instructs the user device to generate content of a native interface element (FIG. 1, 116; FIG. 6, 644) and to incorporate the content of the native interface element into a native user interface (FIG. 1, 114; FIG. 6, 614) associated with a native application (FIG. 1, 110), in lieu of the content of the native interface element from a server (FIG. 106A; FIG. 4, 400) that executes the native application and that is coupled to the user device via a network (FIG. 1, 104). The operations further comprise, based at least on the user interface rendering instruction, generating (FIG. 5, 504) the content of the native interface element at the user device. The operations further comprise, based at least on the user interface rendering instruction, incorporating (FIG. 5, 506) the content of the native interface element into the native user interface at the user device. The operations further comprise rendering (FIG. 5, 508) the native user interface, including the native interface element, on the user device.

III. Example Computer System

FIG. 8 depicts an example computer 800 in which embodiments may be implemented. Any one or more of the user devices 102A-102M and/or any one or more of the servers 106A-106N shown in FIG. 1, the server 400 shown in FIG. 4, and/or the user device 600 shown in FIG. 6 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the native application execution logic 108, the native application UI rendering agent 112, the native application execution logic 408, the execution logic 422, the rendering instruction logic 424, the hosting logic 426, the native application UI rendering agent 612, the UI element generation logic 632, the incorporation logic 634, the UI rendering logic 636, the hosting logic 638, flowchart 200 (including any step of flowchart 200), flowchart 300 (including any step of flowchart 300), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A server comprising:
 memory; and
 a processing system coupled to the memory, the processing system configured to:
  execute a native application on the server;
  receive a notification at the server from a user device that is coupled to the server via a network, the notification indicating that a user-generated action is performed with regard to a native user interface of the native application on the user device; and
  in response to the notification indicating that the user-generated action is performed with regard to the native user interface of the native application on the user device, perform the following operations:
   trigger generation of a description of a change that is to be made to a native interface element of the native user interface of the native application as a result of the user-generated action; and
   cause the native user interface of the native application, including the change to the native interface element, to be rendered on the user device by providing a user interface rendering instruction, which includes the description of the change that is to be made to the native interface element of the native user interface of the native application, in lieu of content of the change, from the server to the user device, wherein the user interface rendering instruction instructs the user device to generate the content of the change and to incorporate the content of the change into the native interface element of the native user interface of the native application.

2. The server of claim 1, wherein the processing system is configured to:
  instruct the user device to generate the content of the change and to incorporate the content of the change into the native interface element of the native user interface of the native application without using a web view.

3. The server of claim 1, wherein the processing system is further configured to:
  host a stateful representation of the native application, including a stateful representation of the native user interface, on the server.

4. The server of claim 1, wherein the processing system is configured to:
  receive the notification at the server from the user device via a WebSocket connection; and
  provide the description of the change that is to be made to the native interface element, in lieu of the content of the change, from the server to the user device via the WebSocket connection.

5. The server of claim 1, wherein the processing system is configured to:
  receive the notification at the server from the user device via a transmission control protocol (TCP) connection; and
  provide the description of the change that is to be made to the native interface element, in lieu of the content of the change, from the server to the user device via the TCP connection.

6. The server of claim 1, wherein the native interface element enables a user of the native application to access a feature of another application, which is different from the native application.

7. The server of claim 1, wherein the native application is a computer program that is configured to run on a particular platform; and
  wherein the native user interface is a user interface that is not created using hypertext markup language and is not created using cascade style sheets.

8. The server of claim 7, wherein the particular platform is a particular operating system or a particular processor type.

9. A method implemented by a user device, the method comprising:
  receiving, at the user device, a user interface rendering instruction, in lieu of content of a native interface element, from a server that executes a native application and that is coupled to the user device via a network, wherein the user interface rendering instruction instructs the user device to generate the content of the native interface element and to incorporate the content of the native interface element into a native user interface associated with the native application;
  in response to the user interface rendering instruction;
    generating the content of the native interface element at the user device;
    incorporating the content of the native interface element into the native user interface at the user device; and
    rendering the native user interface, including the native interface element, on the user device.

10. The method of claim 9, wherein receiving the user interface rendering instruction comprises:
  receiving, at the user device, the user interface rendering instruction, in lieu of the content of the native interface element, from the server without using a web view.

11. The method of claim 9, further comprising:
  detecting performance of a user-generated action with regard to the native user interface; and
  instructing the server to update a state of a stateful representation of the native application, including a stateful representation of the native user interface, by providing an action notification, which describes the user-generated action that is performed with regard to the native user interface, from the user device to the server.

12. The method of claim 11, wherein receiving the user interface rendering instruction comprises:
  receiving, at the user device, the user interface rendering instruction in lieu of the content of the native interface element from the server via a WebSocket connection; and
  wherein instructing the server to update the state of the stateful representation of the native application comprises:
    providing the action notification from the user device to the server via the WebSocket connection.

13. The method of claim 11, wherein receiving the user interface rendering instruction comprises:
  receiving, at the user device, the user interface rendering instruction in lieu of the content of the native interface element from the server via a transmission control protocol (TCP) connection; and
  wherein instructing the server to update the state of the stateful representation of the native application comprises:
    providing the action notification from the user device to the server via the TCP connection.

14. The method of claim 9, wherein the native interface element enables a user of the native application to access a feature of another application, which is different from the native application.

15. A computer program product comprising a computer-readable storage medium having instructions recorded thereon for enabling a server to perform operations, the operations comprising:
  executing a native application on the server; and
  causing a native user interface of the native application to be rendered on a user device, which is coupled to the server via a network, by providing a user interface rendering instruction, in lieu of content of a native interface element, from the server to the user device;
  wherein the user interface rendering instruction instructs the user device to generate the content of the native interface element and to incorporate the content of the native interface element into the native user interface.

16. The computer program product of claim 15, wherein the operations further comprise:
  hosting a stateful representation of the native application, including a stateful representation of the native user interface, on the server.

17. The method computer program product of claim 15, wherein the operations further comprise:
  receiving a notification at the server from the user device, the notification indicating that a user-generated action is performed with regard to the native user interface of the native application on the user device; and
  in response to the notification indicating that the user-generated action is performed with regard to the native user interface of the native application on the user device, performing the following operations:
    triggering generation of a description of a change that is to be made to the native interface element of the native user interface of the native application as a result of the user-generated action; and wherein providing the user interface rendering instruction comprises:

provided the description of the change that is to be made to the native interface element, in lieu of content of the change, from the server to the user device.

18. The computer program product of claim 17, wherein the operations comprise:

receiving the notification at the server from the user device via a WebSocket connection; and providing the description of the change that is to be made to the native interface element, in lieu of the content of the change, from the server to the user device via the WebSocket connection.

19. The computer program product of claim 17, wherein the operations comprise:

receiving the notification at the server from the user device via a transmission control protocol (TCP) connection; and providing the description of the change that is to be made to the native interface element, in lieu of the content of the change, from the server to the user device via the TCP connection.

20. The method of claim 15, wherein the native interface element enables a user of the native application to access a feature of another application, which is different from the native application.

* * * * *